(12) United States Patent
Daniel

(10) Patent No.: US 8,892,160 B2
(45) Date of Patent: Nov. 18, 2014

(54) AUTOMATIC DETECTION OF MOBILE PHONE ANTENNAS

(75) Inventor: Tom Daniel, Monmouth Jct., NJ (US)

(73) Assignee: Cellco Partnership, Basking Ridge, NJ (US)

( * ) Notice: Subject to any disclaimer, the term of this patent is extended or adjusted under 35 U.S.C. 154(b) by 334 days.

(21) Appl. No.: 13/475,727

(22) Filed: May 18, 2012

(65) Prior Publication Data

US 2013/0310107 A1    Nov. 21, 2013

(51) Int. Cl.
*H04M 1/00*    (2006.01)

(52) U.S. Cl.
USPC ..................... 455/552.1; 455/550.1

(58) Field of Classification Search
CPC ....... H04W 88/02; H01Q 1/242; H01Q 1/243
USPC ........................................... 455/550.1, 552.1
See application file for complete search history.

(56) References Cited

U.S. PATENT DOCUMENTS

| 8,412,291 | B2* | 4/2013 | Harrison et al. | ............ 455/575.7 |
| 2007/0018895 | A1* | 1/2007 | Bolin | ............................ 343/702 |
| 2009/0109117 | A1* | 4/2009 | Johansson et al. | ............ 343/876 |
| 2010/0248651 | A1 | 9/2010 | Dent | |

* cited by examiner

*Primary Examiner* — Marisol Figueroa

(57) ABSTRACT

A method and device is provided that determines whether an antenna is electrically connected to its respective coupling device. The first side of the device includes coupling device, a mechanical switch, and an application processor. The second side includes an antenna contact that that is creates an electrical connection with a coupling device on the first side when the first side is securely attached to the second side. The mechanical switch is configured to be in an "open" state when the antenna contact does not make an electrical connection with the coupling device. Each mechanical switch is configured to be in a "closed" state when the antenna contact does make an electrical connection with its coupling device. The application processor determines the state of each mechanical switch. When any switch is an "open" state, it provides a notification on an interface of the mobile device.

22 Claims, 7 Drawing Sheets

AUTOMATIC DETECTION OF MOBILE PHONE ANTENNAS

BACKGROUND

In recent years, mobile wireless communications have become increasingly popular. Initial implementations of mobile wireless communications, for example in the form of cellular telephone networks, supported circuit switched voice communication services. The carriers developed short message service (SMS) technology to provide text and/or e-mail communications via the wireless communication networks. As the wireless communication networks have evolved to provide greater bandwidth and packet based services, the industry has developed a variety of data services, such as email, web browsing, as well as a variety of services using multimedia message service (MMS) technology. Further, mobile devices have evolved to include an ever increasing number of features, including WiFi internet access and global positioning system (GPS) capability. While the features and capabilities of mobile devices are steadily increasing, the dimensions of mobile devices are decreasing in size.

To accommodate the increasing demand in wireless services, wireless packet data communication is being provided with ever increasing transmission speed. The packet data communication allows mobile device users to expand the scope of their use of the mobile device, for example, to enjoy multimedia services at a speed comparable to those enjoyed via Internet connected personal computers (PCs). The shift from third generation (3G) to fourth generation (4G) telecommunication data services marks another significant step in providing improved data service. For example, download speeds in 4G can be about ten times faster than 3G, sometimes reaching residential broadband service speed. Further, the frequency spectrum used in 4G can better penetrate buildings, offering better signal strength. Until a complete transition to 4G occurs, many 4G mobile devices provide backward compatibility to 3G.

Mobile devices often use multiple antennae at the transmitter and receiver to facilitate communication and backward compatibility. For example, with the advent of long term evolution (LTE) technology, at least two antennae are required: one for receiving and one for transmission. Further, different antennae are used for 4G and 3G (for downward compatibility). Further, there may be additional antennae for GPS, Global System for Mobile Communication (GSM), and Bluetooth, WiFi, etc.

Including such a large number of antennae in an ever shrinking form factor is a challenge. For example, a transmit antenna may experience crosstalk due to mutual coupling between the antennae when a signal transmitted by one antenna couples to, and is therefore received by, one or more of the other transmit antennae. Such crosstalk effectively couples the transmitters, which may cause various transmitter problems, e.g., back intermodulation interference at the transmitter output terminals, transmitter mismatch, efficiency loss, etc. Mobile devices may reduce and/or eliminate the mutual coupling by physically separating the antennae to spatially isolate the antennae. In this regard, some antennae are placed on back covers to provide sufficient separation between antennae.

In order to provide sufficient signal strength, the contact of an antenna between the back cover and the main unit must be secure. For example, a secure connection is provided when the back cover is properly connected to the main unit and the contacts between the back cover and the main unit align such that there is electrical contact. In many situations, however, the back cover is not secured properly. For example, a mobile device could be dropped, or the back cover may not be secured properly after a component (e.g., battery or chip) is replaced in the phone, etc. When the back cover of a mobile device is not properly secured, an antenna may not have proper contact with its coupling device on the other side of the mobile device. Thus, when a connection between the antenna and its respective receiving device is poor, the performance related to the antenna degrades. For example, the GPS may not be able to communicate with satellites, the 3G/4G may not be able to communicate with its respective base station (BS), or a WiFi signal may substantially degrade.

The user of a mobile device may not be aware that a loss of functionality is due to a poor antenna contact. Instead, a user may conclude that the mobile device is defective and ultimately return the mobile device. There currently is no effective means of providing a notification that an antenna is not properly secured to the mobile device.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and/or circuitry have been described at a relatively high-level, without detail, in order to avoid unnecessarily obscuring aspects of the present teachings.

The various technologies disclosed herein relate to determining whether an antenna is connected to its respective transceiver. A mechanical switch is used to determine whether physical contact is made between an antenna and its corresponding coupling device. The antenna is separate from the coupling device when the back side of a mobile device is opened and is intended to make contact with its coupling device when the main side of the mobile device is securely fastened to the back side. The state of the mechanical switch is interpreted by an application processor. Responsive to the state of the mechanical switch the application processor provides a message indicating that the antenna is not successfully connected to its coupling device.

Figure 1A:
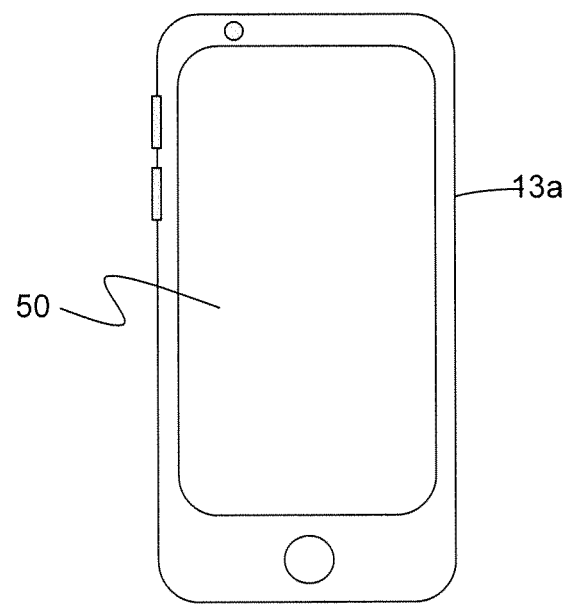
FIG. 1a illustrates a first side of a mobile device including at least one antenna.
Figure 1B:
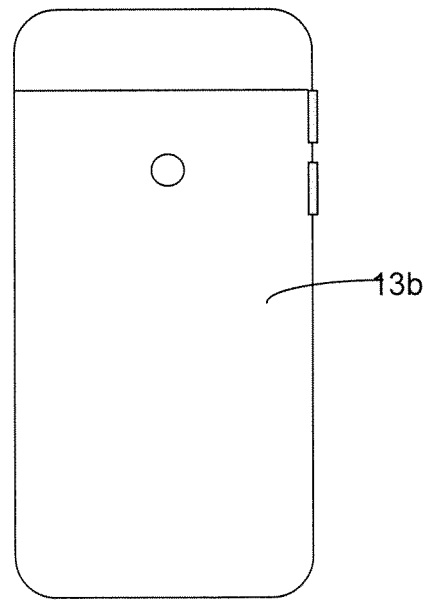
FIG. 1b illustrates a second side of a mobile device.

Reference now is made in detail to the examples illustrated in the accompanying drawings and discussed below. FIG. 1a illustrates a first side (e.g., main side) and FIG. 1b illustrates a second (e.g., back) side of a mobile device 13. The second side 13b securely attaches to the first side 13a of the mobile device 13. Accordingly, the mobile device 13 has a body comprising a first side 13a and a second side 13b, where both sides are configured to securely attach together to provide a single housing. In the example of FIG. 1a, the first side 13a includes an output display 50, which can be used for displaying several types of information, such as call related information dialed by the user, calling party numbers, and the like. Output display 50 can also display messages, menus, or the like, including warning messages indicating that an antenna is not properly connected to its coupling device.

Thus, the output display 50 is a physical interface element providing a textual or graphical user interface for use when the mobile device 13 is in use. In addition to normal telephone communication related input/output, display 50 may be used for display of menus and other information to the user and user input of selections, if needed during a system operation when the mobile device 13 is in use. Of course other user interface elements may be used, such as a stylus and touch sensitive display screen. The first side 13a and the second side 13b do not need to be securely fastened for the display 50 to be operational.

In the "open" state, where the first side 13a and the second side 13b are separate, a user may have access to the internal electronics of the mobile device 13, including, for example, the battery, a subscriber identity module (SIM), and flash memory card. The first side 13a, the second side 13b, or both sides include one or more antennae. In the "open" state, one or more antennae may be physically and electromagnetically severed from their respective transceiver. When the first side 13a is securely fastened to the second side 13b, each antenna is coupled to its respective transceiver. The first side 13a is fastened to the second side by snapping both sides together by latches or sliding both sides together. However, it is contemplated that other methods of connecting both sides of the mobile device can be used as well.

Figure 2A:
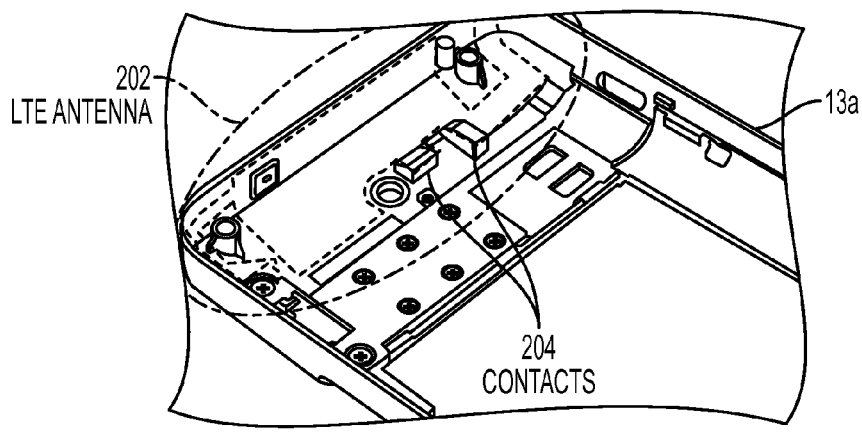
FIG. 2a illustrates an exemplary inside view of a first side of the mobile device.

FIG. 2a illustrates an exemplary inside view of the first side 13a of the mobile device 13. For simplicity, many of the components of the first side 13a have been removed. By way of example, first side 13a has at least one antenna 202, which is disconnected from its respective receiver or transmitter (not shown). For simplicity, the following discussion refers to a receiver or transmitter simply as a transceiver (XCVR).

Each antenna includes at least one contact that couples the antenna to its respective coupling device (not shown). For example, a coupling device physically connects to the contact 204 of the antenna 202, thereby providing an electric path between the antenna 202 and its respective transceiver. Thus, if there is no physical connection between contact 204 and its coupling device, the antenna 202 may not be able to communicate with its respective transceiver. A connection between the contact 204 and its respective coupling device is established when the second side 13b of the mobile device 13 is securely fastened to the first side 13a.

Figure 2B:
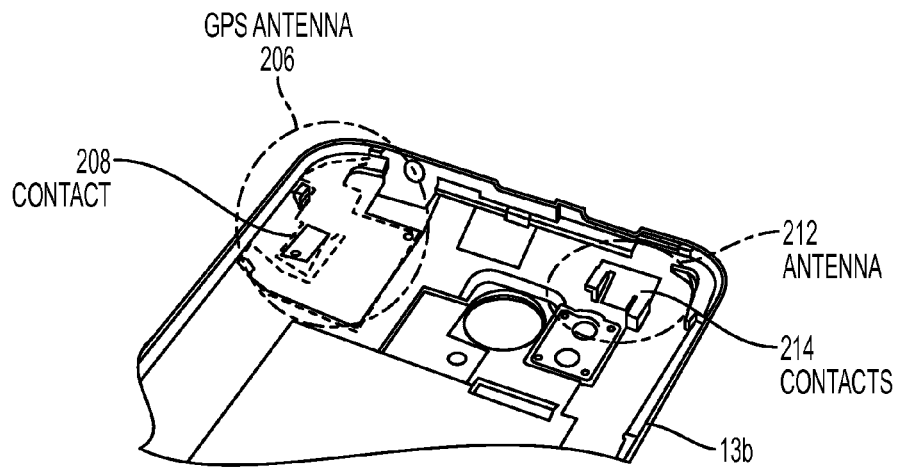
FIG. 2b illustrates an exemplary second side of a mobile device that includes at least one antenna.
Figure 2C:
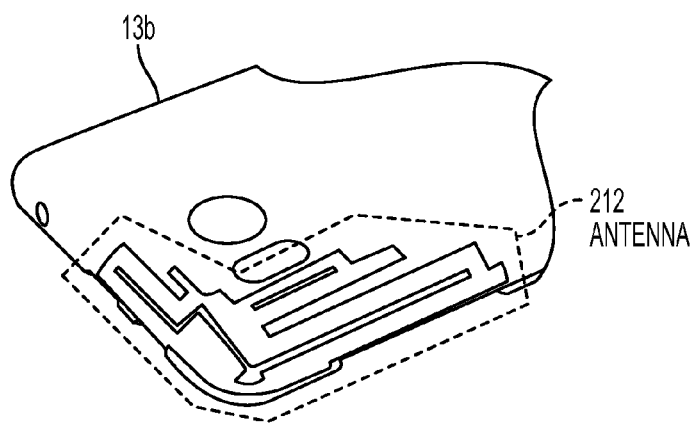
FIG. 2c illustrates an exemplary second side of a mobile device wherein the skin of the outside cover has been partially removed to expose an embedded antenna.

FIGS. 2b and 2c illustrate exemplary back covers (i.e., second sides 13b) that include at least one antenna. For example, FIG. 2b includes a GPS antenna 206 on the left side of the second side 13b and another LTE antenna 212 on the right side. GPS antenna 206 includes a contact 208 that electrically connects to its respective coupling device (not shown) when the second side 13b is securely fastened to the first side 13a. Similarly, antenna 212 includes at least one contact 214 that electrically connects to its respective coupling device (not shown) when the second side 13b is securely fastened to the first side 13a.

FIG. 2c illustrates an exemplary second side 13b wherein the skin of the outside cover has been partially removed to expose an embedded antenna 212. When the second side 13b is securely fastened to the first side 13a of the mobile device 13, antenna 212 is connects to its respective transceiver through its contact(s) 214 and corresponding coupling device on the first side 13a.

Figure 3:
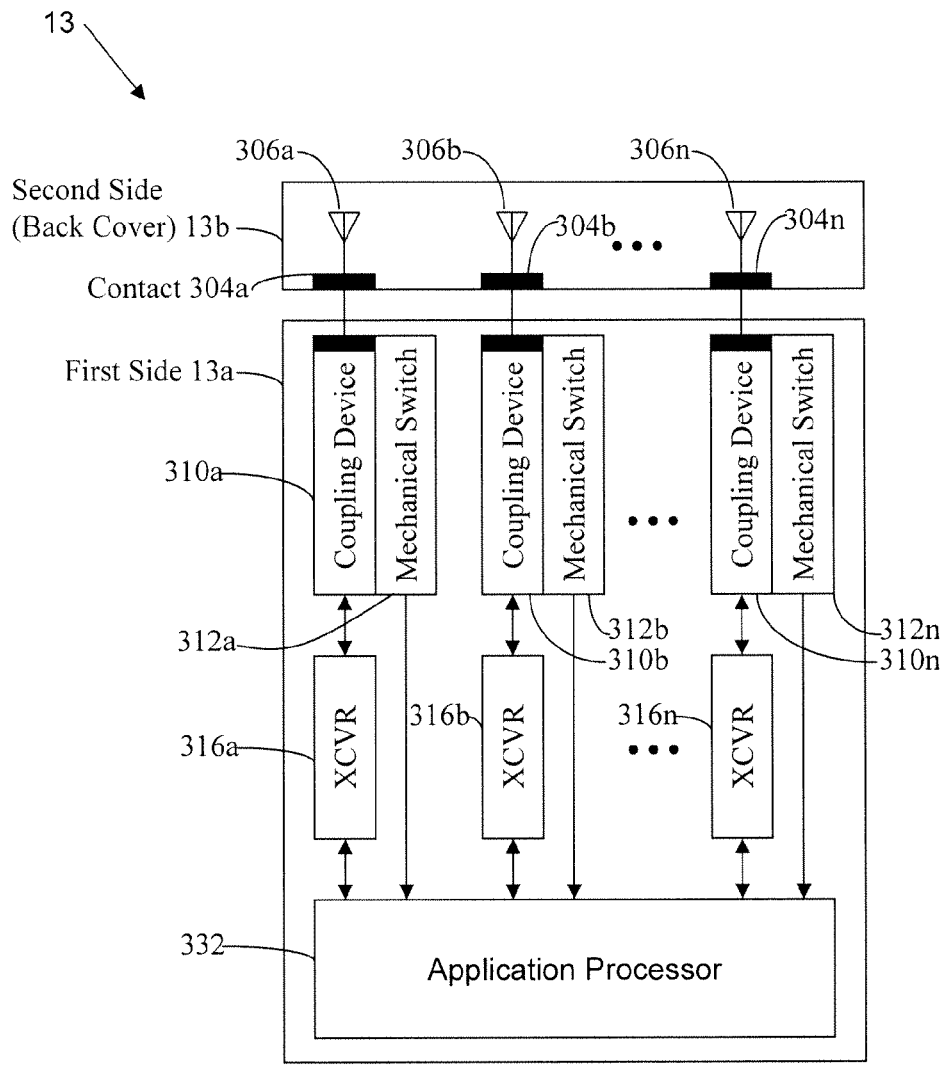
FIG. 3 is a simplified block diagram of a mobile device including a first side and a second side.

FIG. 3 is a simplified block diagram of a mobile device 13 including a first side 13a and a second side 13b, wherein a plurality of antennae on the second side 13b are configured to be coupled to the first side 13a. In the example of FIG. 3, the second side (i.e., back cover) 13b includes antennae 306a to 306n. Each antenna includes at least one contact (e.g., 304a to 304n) that allows the antenna to couple with the first side 13a. For example, antenna 306a (through its contact 304a) physically connects to its corresponding coupling device 310a when the second side 13b securely attaches to the first side 13a. Accordingly, there is a physical connection between the contact of an antenna (e.g., 304a) and its coupling device (e.g., 310a). This connection creates an electrical path between the antenna 306a and its corresponding transceiver 316a. The transceiver 316a provides two-way wireless communication of information, in accordance with the technology of the system. For example, the transceiver 316a may be configured for GPS, WiFi, or LTE communication.

Each coupling device (e.g., 310a) has a corresponding mechanical switch (e.g., 312a) that determines whether the electrical contact between a contact (e.g., 304a) and its corresponding coupling device (e.g., 310a) is successful. Upon determining that there is no electrical connection between the contact 304a and its corresponding coupling device 310a the mechanical switch 312a remains in an "open" state. For example, the "open" state condition occurs when the second side 13b is separate (or not securely fastened) to the first side 13a. However, upon determining that there is an electrical connection between the contact 304a and its corresponding coupling device 310a, the mechanical switch is in a "closed" state. For example, the "closed" state condition occurs when the second side 13b is securely fastened to the first side 13a of the mobile device 13.

Although FIG. 3 illustrates a separate mechanical switch for each antenna, several switches could be used with a single antenna, e.g., if the functionality (e.g., operation in a cell band such as 700 MHz or 1900 MHz) of a particular antenna was of more importance than others. In another example, several antennae could correspond to a single mechanical switch. Put differently, a single mechanical switch determines whether several antennae are connected properly. Further, in one example, a hybrid approach can be used such that one switch (or redundant switches) may be dedicated for cell band operation while another switch may be dedicated for a plurality of antennae associated with less critical features, such as GPS, WiFi, and Bluetooth. In other words, at least as many switches as antennae may be used for communications in certain bands while fewer switches than antennae are used for communications in other bands.

The status of each mechanical switch is provided to the application processor 332. The application processor 332 serves as a programmable controller or processor for the mobile device 13, in that it controls all operations of the mobile device 13 in accordance with programming that it executes, for all normal operations, and for specific operations in consideration here. For example, responsive to the state of each mechanical switch, the application processor 332 provides a notification on a user interface of the mobile device 13 indicating that the contact (e.g., 304a) of the respective antenna (e.g., 306a) is not making an electrical connection with its corresponding coupling device (e.g., 310a) and/or that the back cover is not securely fastened, thereby eliminating some or all functionality (or merely provide instructions to fasten the back cover). The notification may be a message (e.g., pop-up) on the output display (e.g., 50 in FIG. 1a) of the mobile device, an audible tone, a haptic signal, or any combination thereof. In one example, the notification may include instructions to securely fasten the second side 13b to the first side 13a of the mobile device. Upon determining that all antennae are making electrical connection with their coupling devices (through determining e.g., that all mechanical switches are "closed") the application processor 332 may remove the error notification and/or replace it with a notification that each antenna (i.e., 306a to 306n) is making proper contact with its corresponding coupling device (i.e., 310a to 310n). Each of the various notifications may be provided for a predetermined amount of time, which may vary depending on the type of notification, and may repeat intermittently as desired. The amount of time, repetition rate, type of notification and/or characteristics of the notification (e.g., display, tone, volume, vibration) may also vary depending on which antenna is not making electrical connection with its coupling device as well as the number of antennae not making electrical connection with their coupling devices.

Figure 4A:
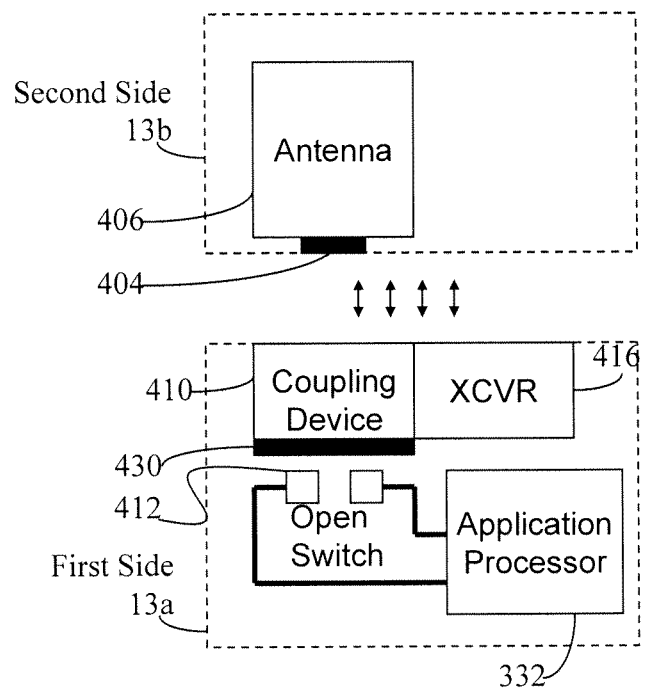
FIG. 4a illustrates an exemplary block diagram of a mobile device wherein the mechanical switch is in an "open" state.

With the foregoing overview of the system, it may be helpful now to consider a high-level discussion of the operation of the mechanical switch. In this regard, FIGS. 4a to 4d are exemplary block diagrams illustrating different ways a switch determines whether a coupling device makes a successful electrical connection with the contact of an antenna. FIG. 4a illustrates an exemplary block diagram of a mobile device wherein the mechanical switch is in an "open" state. In FIG. 4a, second side 13b is mechanically separate from the first side 13a. In this regard, the antenna 406 is not electrically connected to its corresponding coupling device 410 because there is a physical gap between its contact 404 and the coupling device 410. Since there is no mechanical pressure from the second side 13b, the coupling device 410 leaves a gap between the contacts of the mechanical switch 412. For example, the coupling device has an electrical contact 430 that is configured to create an electrical path across the contacts of the mechanical switch 412 when the second side 13b presses the coupling device across the mechanical switch 412. Thus, in the example of FIG. 4a, the transceiver 416 cannot communicate through the antenna 406 and the application processor 332 determines that the mechanical switch 412 is in an open condition. In this state, if a user powers ON the mobile device 13 (i.e., reactivates the mobile device 13 from a deactivated state or hibernation state), the application processor 332 sends an error message to a user interface of the mobile device 13 to indicate that there may be a failed connection between the antenna 406 and the coupling device 410.

Figure 4B:
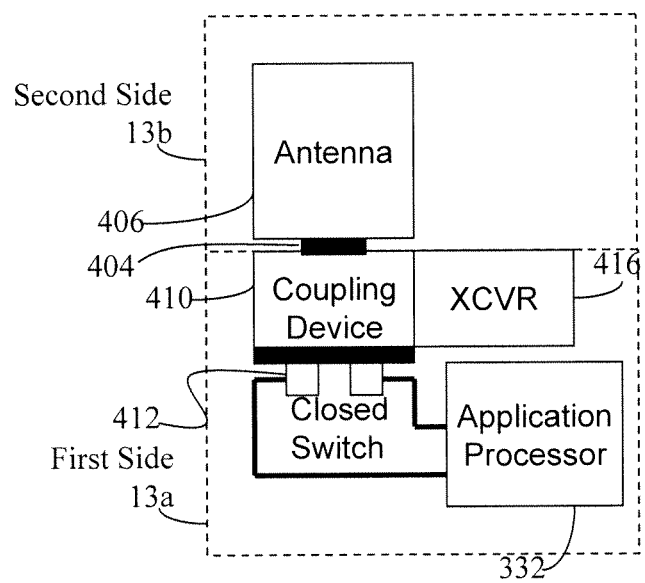
FIG. 4b illustrates an exemplary block diagram of a mobile device wherein the mechanical switch is in a "closed" state.

FIG. 4b illustrates an exemplary block diagram of a mobile device wherein the mechanical device is in "closed" state. The second side 13b is securely fastened to the first side 13a. In this regard, there is mechanical pressure between the contact 404 of the antenna 406 and its corresponding coupling device 410. Since there is an electrical contact between the antenna 406 and the coupling device, the transceiver 416 can communicate through its antenna 406. The mechanical pressure from the second side 13b and the first side 13a moves the coupling device closer to the mechanical switch 412, thereby creating a short between the contacts of the mechanical switch 412. Thus, the pressure from the antenna contact 404 pushes the coupling device 410 closer to the contacts of the mechanical switch 412, thereby creating a short across the contacts of the mechanical switch 412. Accordingly, since the mechanical switch 412 is now in a "closed" state, when the mobile device is turned ON, the application processor 332 infers that there is a proper connection between the antenna 406 and its corresponding coupling device 410.

Figure 4C:
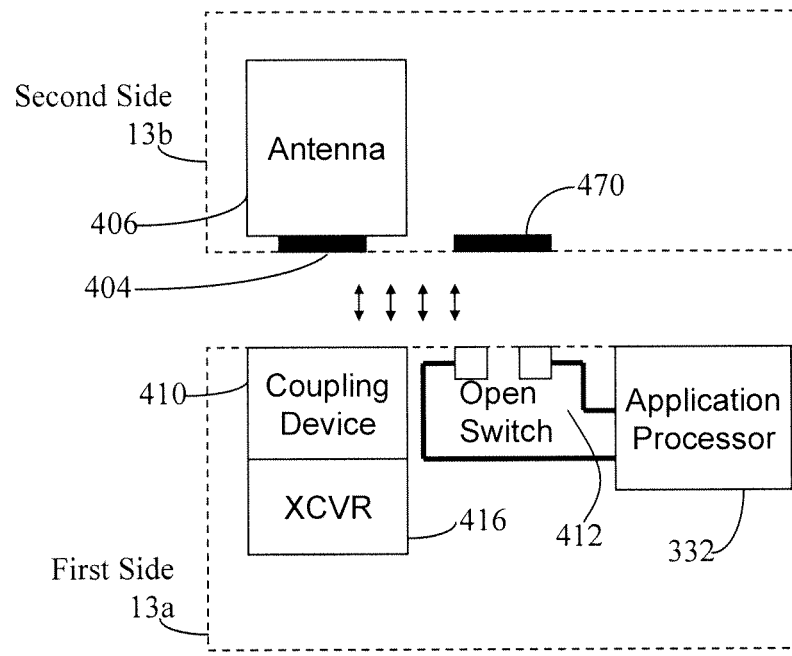
FIG. 4c illustrates another exemplary block diagram of a mobile device wherein the mechanical switch is in an "open" state.

FIG. 4c illustrates another exemplary block diagram of a mobile device where the mechanical switch is in an "open" state. In FIG. 4c, second side 13b is mechanically separate from the first side 13a. In this regard, the antenna 404 is not electrically connected to its corresponding coupling device 410 because there is a gap between its contact 404 and the coupling device 410. The second side has at least one additional contact 470 on substantially the same plane as contact 404 that is dedicated to the mechanical switch 412. In the example of FIG. 4c, the contacts of the mechanical switch 412 are on substantially the same plane as the coupling device 410. Further, the contacts of the mechanical switch 412 are substantially on the same plane as the contacts of the coupling device 410 and vertically aligned to the dedicated contact 470. In one example, the dedicated contact 470 is very close (e.g., within about a cm) to the antenna contact 404.

Since there is no mechanical pressure from the second side 13b, the dedicated contact 470 leaves a gap between the contacts of the mechanical switch 412 and the coupling device 410. Thus, the transceiver 416 cannot communicate through the antenna 406. Further, since the dedicated contact 470 is also separate from the contacts of the mechanical switch 412, the mechanical switch 412 remains in the "open" state. Accordingly, the application processor 332 makes an indirect determination the antenna 406 and coupling device 410 (and thus the transceiver 416 and antenna 406) are not connected. As discussed above, the determination is indirect because it is an inference based on the mechanical switch 412 being in an "open" state instead of a direct measurement of the actual contact 404. In this state, if a user powers ON the mobile device 13, the application processor 332 sends an error message to a user interface of the mobile device 13 to indicate that there may be a failed connection between the antenna 406 and its corresponding coupling device 410.

Figure 4D:
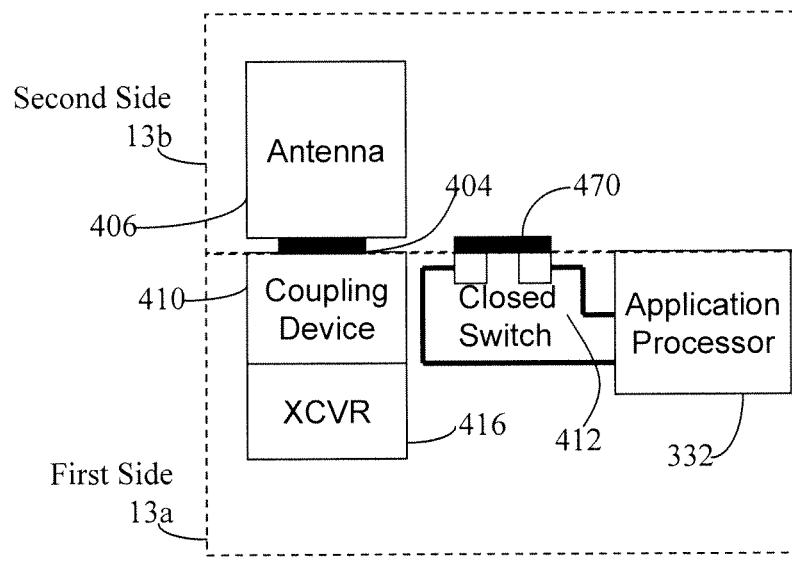
FIG. 4d illustrates another exemplary block diagram of a mobile device wherein the mechanical switch is in a "closed" state.

FIG. 4d illustrates an exemplary block diagram of a mobile device wherein the mechanical device is in "closed" state. The second side 13b is securely fastened to the first side 13a. In this regard, there is mechanical pressure between the contact 404 of the antenna 406 and its corresponding coupling device 410. The dedicated contact 470 is vertically aligned with the contacts of the switch 412. Since the dedicated contact 470 is on substantially the same plane as the antenna contact 404 and the contacts of the mechanical switch 412 are on substantially the same plane as the coupling device 410, the mechanical switch 412 is in a "closed" state. Accordingly, the transceiver 416 can communicate through the antenna 406. Further, since the mechanical switch 412 is now in a "closed" state, when the mobile device is turned ON, the application processor 332 infers that there is an electrical connection between the antenna 406 and its corresponding coupling device 410. Again, this determination is indirect because it is an inference based on a dedicated contact 470 instead of an actual (i.e., direct) measurement of antenna contact 404.

Figure 4E:
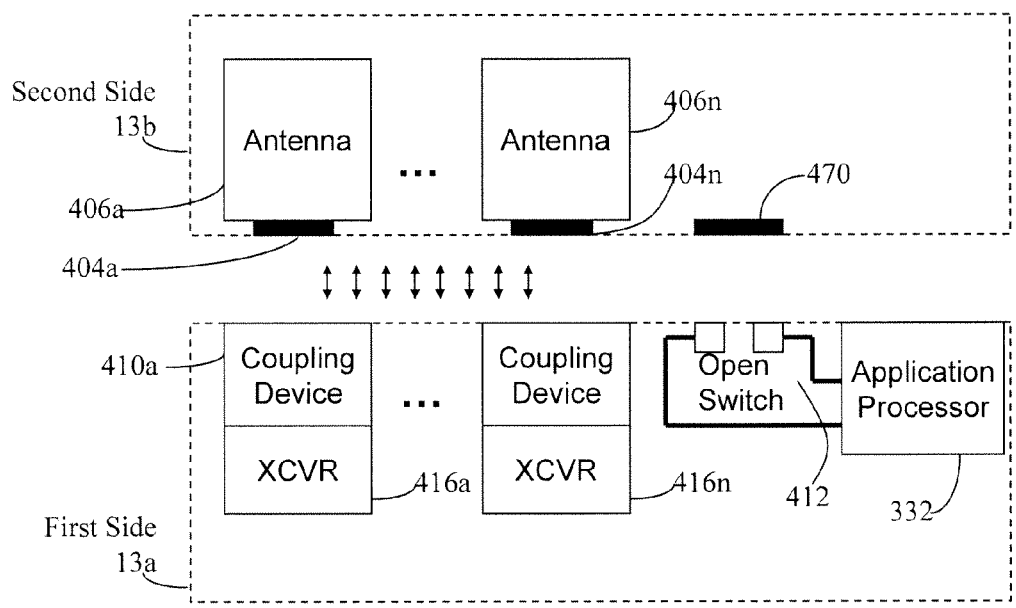
FIG. 4e illustrates another exemplary block diagram of a mobile device wherein the mechanical switch corresponding to a plurality of antennae is in an "open" state.
Figure 4F:
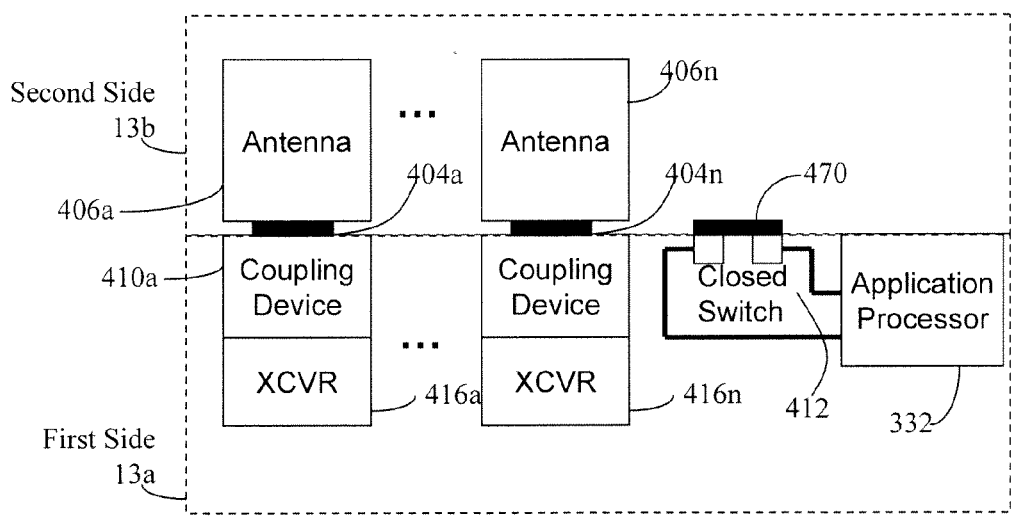
FIG. 4f illustrates another exemplary block diagram of a mobile device wherein the mechanical switch corresponding to a plurality of antennae is in a "closed" state.

FIG. 4e illustrates another exemplary block diagram of a mobile device where the mechanical switch corresponding to a plurality of antennae is in an "open" state. FIGS. 4e and 4f are substantially similar to FIGS. 4c and 4d respectively, and their features are therefore not described in detail for brevity. The main difference between FIGS. 4e/f and 4c/d is that the switch 412 in FIGS. 4e/f now corresponds to a plurality of antennae (i.e., 406a to 406n). Put differently, a single mechanical switch 4012 determines whether antennae 406a to 406n are connected properly.

Figure 5:
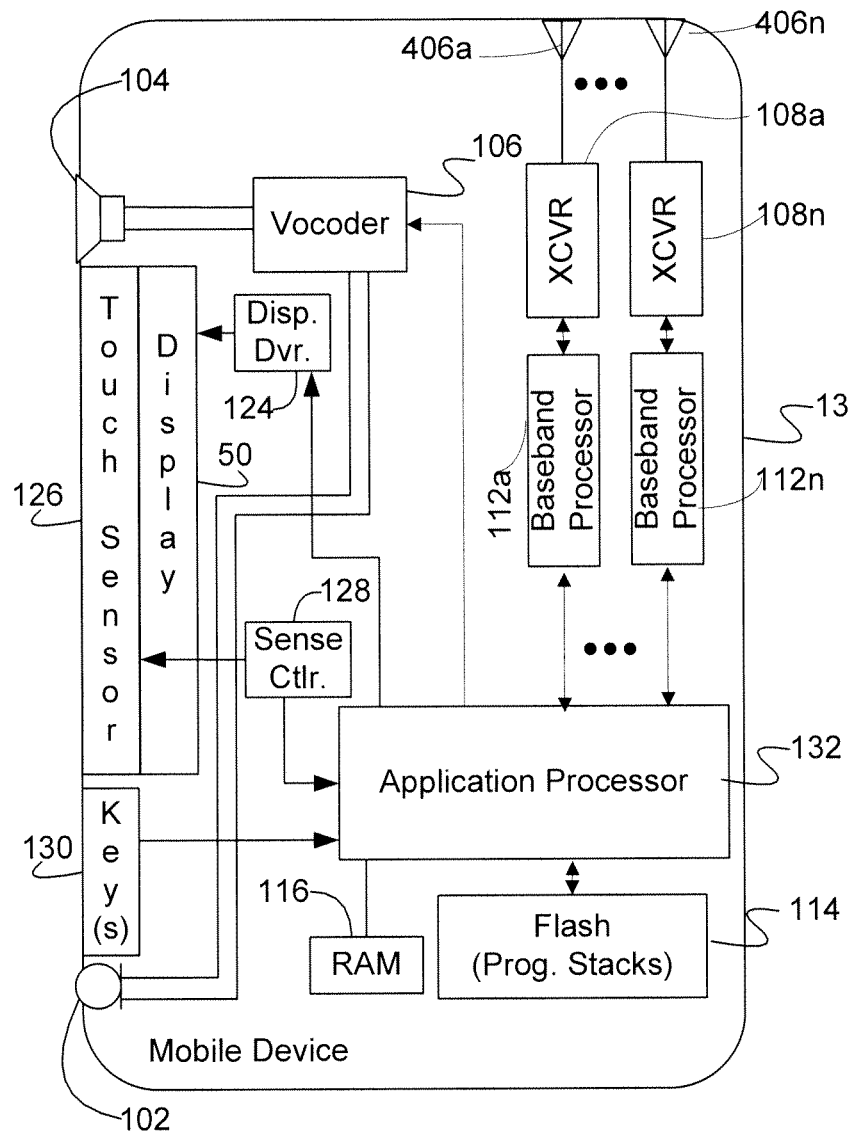
FIG. 5 illustrates a high level simplified function block diagram of an exemplary mobile device 13.

It may be useful to consider the functional elements/aspects of an exemplary mobile device 13 at a high-level. For purposes of discussion, FIG. 5 illustrates a high level simplified function block diagram of an exemplary mobile device 13. Specifically, it provides a block diagram illustration of an exemplary touch screen mobile device 13 where the first side and the second side discussed above are securely fastened. For digital wireless communications, the mobile device 13 also includes a plurality of transceivers (XCVR) 108a to 108n for 3G, 4G, WiFi, etc. respectively. The concepts discussed here encompass embodiments of the mobile device 13 utilizing any digital transceivers that conform to current or future developed digital wireless communication standards. It will be understood that the mobile device 13 may include additional antennae and supporting circuitry for GPS, GSM, and Bluetooth, WiFi, etc. which are not explicitly shown for simplicity.

Each transceiver 108a to 108n provides wireless communication of information, such as vocoded speech samples and/or digital message information, in accordance with the technology of the communication system (e.g., 3G, 4G, GPS, etc.). In this example, the transceivers 108a to 108n also receive (and sometimes send) a variety of signaling messages in support of the various voice and data services provided via the mobile device 13 and the communication network. Each transceiver (e.g., 108a to 108n) connects through radio frequency (RF) send and receive amplifiers (not separately shown) to its respective antenna (e.g., 406a to 406n). In the example, some transceivers are configured for RF communication in accord with a digital wireless protocol, such as the current CDMA and 3GPP protocols consistent with 3G, 4G, and beyond.

Each transceiver corresponds to its respective baseband processor (e.g., 112a to 112n). A baseband processor is an integrated circuit (IC) that performs various signal processing functions, including processing of digitized information from and to its corresponding transceiver (e.g., 108a to 108n) within the mobile device 13. Depending on the system architecture of a mobile device 13, the digital signal processing functions of a baseband processor (e.g., 112a to 112n) may include voice coding/decoding, channel coding/decoding, equalization, digital modulation/demodulation, etc. in accordance with the technology of its respective network.

At a high level, for transmission of data, the baseband processor (e.g., 112a to 112n) receives outbound data and provides digitally processed transmit data to its respective transceiver (e.g., 108a to 108n) for transmitting them through RF send amplifier (not shown) to its corresponding antenna 406a to 406n. Likewise, for reception of data, the baseband processor (e.g., 112a to 112n) receives receive data from its corresponding transceiver 108a to 108n via RF receive amplifier (not shown) and its corresponding antenna 406a to 406b, processes them and/or outputs the digitally processed data to various components such as display 118, speaker 104, application processor 132, application software, etc. The application processor 132 determines whether an antenna (e.g., 406a to 406n) is properly connected to its respective transceiver (e.g., 108a to 108n). This determination is based on the status of mechanical switches (not shown) associated with each antenna. Upon determining that each mechanical switch is closed, the application processor 132 communicates through the respective baseband processor 112a to 112n.

The mobile device 13 includes a display 50 for displaying messages, menus or the like, call related information dialed by the user, calling party numbers, etc., as well as notification messages from the application processor 132 discussed herein. The wireless mobile device 13 also includes a touch/position sensor 126. The sensor 126 is relatively transparent, so that the user may view the information presented on the display 50. A sense controller 128 sensing signals from elements of the touch/position sensor 126 and detects occurrence and position of each touch of the screen formed by the display 50 and sensor 126. The sense circuit 128 provides touch position information to the microprocessor 112, which correlates that information to the information currently displayed via the display 50, to determine the nature of user input via the screen.

The display 50 and touch sensor 126 (and possibly one or more keys 130, if included) are the physical elements providing the textual and graphical user interface for the mobile device 13a. The microphone 102 and speaker 104 may be used as additional user interface elements, for audio input and output. Of course, other user interface elements may be used, such as a trackball, as in some types of PDAs or smart phones.

Mobile device 13 may also include a haptic element (not shown) to provide haptic feedback to the user. Various combinations of the keypad 120, display 50, microphone 102, haptic element, and speaker 104 may be used as the physical input output elements of the graphical user interface (GUI), for multimedia (e.g., audio and/or video) communications. Of course other user interface elements may be used, such as a stylus and touch sensitive display screen, as in a PDA or smart phone. In addition to normal telephone and data communication related input/output (including message input and message display functions), the user interface elements also may be used for display of menus and other information to the user and user input of selections, for example, including any notification on respective status of the connection of each antenna 406a to 406n, and whether the back cover (e.g., second side) should be securely fastened to the front side (e.g., first side) of the mobile device 13.

In the example of FIG. 5, the application processor 132 serves as a programmable controller or processor for the mobile device 13, in that it controls all operations of the mobile device 13 in accord with programming that it executes, for all normal operations, and for operations involved in determining the status of each mechanical switch associated with each antenna 406a to 406n. For example, the application processor 132 may manage application operation such as processing emails with images, playing video and audio, and supporting video telephony and similar multimedia applications. While running various applications for the user of the mobile device 13a, the application server 132 may communicate at the same time with either a 3G baseband processor 112a or a 4G baseband processor 112n.

In the example, the mobile device 13 includes flash type program memory 114, for storage of various "software" or "firmware" program routines and mobile configuration settings, such as mobile telephone number (MTN or MDN), etc. The mobile device 13 may also include a non-volatile random access memory (RAM) 116 for a working data processing memory. In a present implementation, the flash type program memory 114 stores firmware such as a boot routine, device driver software, an operating system, call processing software and vocoder control software, and any of a wide variety of other applications, such as client browser software and short message service software. The memories 114 and 116 also store various data, such as telephone numbers and server addresses, downloaded data such as multimedia content, and various data input by the user. Programming stored in the flash type program memory 114, sometimes referred to as "firmware," is loaded into and executed by the application processor 132.

As outlined above, the mobile device 13 includes an application processor 132, and programming stored in the flash memory 134 configures the application processor 132 so that the mobile device 13 is capable of performing various functions, including in this case the functions involved in determining whether there is a proper connection between an antenna (e.g., 406a to 406n) and its respective transceiver, and responsive to the determination, providing notifications on a user interface of the mobile device 13.

In one example, aspects of the methods of determining whether an antenna (e.g., 406a to 406n) is connected to its respective transceiver (108a to 108n) outlined above may be embodied in programming. Program aspects of the technology may be thought of as "products" or "systems of manufacture" typically in the form of executable code and/or associated data that is carried on or embodied in a type of non-transitory machine readable medium, such as flash memory 114 or RAM 116.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, system, or apparatus that comprises a list of elements does not include only those elements but may include other elements not expressly listed or inherent to such process, method, system, or apparatus. An element proceeded by "a" or "an" does not, without further constraints, preclude the existence of additional system elements in the process, method, system, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Appendix: Acronym List

The description above has used a large number of acronyms to refer to various services, messages, and system components. Although generally known, use of several of these acronyms is not strictly standardized in the art. For the convenience of the reader, the following list correlates terms to acronyms, as used by way of example in the detailed description above.

3G—Third Generation Telecommunication
3GPP—3'rd Generation Partnership Project
4G—Fourth Generation Telecommunication
BS—Base Station
BTS—Base Transceiver System
CDMA—Code Division Multiple Access
GPS—Global Positioning System
GUI—Graphical User Interface
GSM—Global System for Mobile Communication
IC—Integrated Circuit
LTE—Long Term Evolution
MD—Mobile Device
MDN—Mobile Directory Number
MMS—Multimedia Messaging Service
MTN—Mobile Telephone Number
PC—Personal Computer
PDA—Personal Digital Assistant
RAM—Random Access Memory
RF—Radio Frequency
ROM—Read Only Memory
SIM—Subscriber Identity Module
SMS—Short Message Service
WAN—Wide Area Network
XCVR—Transceiver

What is claimed is:
1. A mobile device comprising:
a first side comprising:
at least one coupling device;
at least one mechanical switch associated with, and physically separate from, the coupling device; and
an application processor;

a second side configured to securely attach to the first side, the second side comprising at least one antenna having an antenna contact, wherein each antenna contact is configured to create an electrical connection with a respective coupling device on the first side when the first side is securely attached to the second side;

wherein each mechanical switch is configured to be:
  in an "open" state when the antenna contact of its associated antenna does not make an electrical connection with its respective coupling device on the first side; and
  in a "closed" state when the antenna contact of its associated antenna makes an electrical connection with its respective coupling device on the first side; and wherein the application processor is configured to:
  determine the state of each mechanical switch; and
  upon determining that any mechanical switch is in an "open" state, provide a notification on an interface of the mobile device.

2. The mobile device of claim 1 wherein the application processor is configured to provide the notification responsive to the state of each mechanical switch during power ON of the mobile device.

3. The mobile device of claim 1 wherein all mechanical switches are in the "open" state when the first side is mechanically separate from the second side.

4. The mobile device of claim 1 wherein all mechanical switches are in the "closed" state when the first side is securely attached to the second side.

5. The mobile device of claim 1 wherein:
a first mechanical switch is associated with a first set of one or more coupling devices;
a second mechanical switch is associated with a second set of one or more coupling devices; and
the application processor is further configured to:
  identify all antennae on the second side associated with any of the first set of coupling devices on the first side to be electrically disconnected from their respective coupling device when the first mechanical switch associated with the first set of coupling devices is in an "open" state;
  identify all antennae on the second side associated with any of the second set of coupling devices on the first side to be electrically disconnected from their respective coupling device when the second mechanical switch associated with the second set of coupling devices is in an "open" state;
  identify all antennae on the second side associated with any of the first set of coupling devices on the first side to be electrically connected with their respective coupling device when the first mechanical switch associated with the first set of coupling devices is in the "closed" state; and
  identify all antennae on the second side associated with any of the second set of coupling devices on the first side to be electrically connected with their respective coupling device when the second mechanical switch associated with the second set of coupling devices is in the "closed" state.

6. The mobile device of claim 5 wherein:
the first mechanical switch is dedicated to one or more antennae for cell band operation; and
the second mechanical switch is dedicated to the remaining antennae.

7. The mobile device of claim 1 wherein each mechanical switch is respectively associated with one or more coupling devices such that at least as many mechanical switches as antennae are used for communications in a predetermined set of bands while fewer mechanical switches than antennae are used for communications in other bands.

8. The mobile device of claim 1 wherein:
a single mechanical switch is associated with one or more coupling devices; and
the application processor is further configured to:
  identify all antennae on the second side associated with any of the one or more coupling devices on the first side to be electrically disconnected from their respective coupling device when the single mechanical switch associated with the one or more coupling devices is in an "open" state; and
  identify all antennae on the second side associated with any of the one or more coupling devices on the first side to be electrically connected with their respective coupling device when the single mechanical switch associated with the one or more coupling devices is in the "closed" state.

9. The mobile device of claim 1, wherein the application processor is further configured to provide a notification on a user interface to securely attach the second side to the first side upon determining that any mechanical switch is in the "open" state.

10. The mobile device of claim 1, wherein the at least one coupling device has an electrical contact that is configured to create an electrical path across contacts of the mechanical switch when the first side is securely attached to the second side.

11. The mobile device of claim 1, the second side further comprising a dedicated contact for at least one mechanical switch on the first side, wherein:
the dedicated contact is on substantially the same plane as an antenna contact and substantially vertically aligned to contacts of the at least one mechanical switch; and
the dedicated contact creates a short across the contacts of the at least one mechanical switch when the first side is securely attached to the second side.

12. A method comprising:
determining the state of at least one mechanical switch; and
upon determining that any mechanical switch is in an "open" state, providing a notification on an interface of a mobile device having a first side and a second side;
wherein each mechanical switch is configured to be:
  in an "open" state when an antenna contact of its associated antenna does not make an electrical connection with its respective coupling device on the first side; and
  in a "closed" state when the antenna contact of its associated antenna makes an electrical connection with its respective coupling device on the first side;
wherein the second side is configured to securely attach to the first side; and
wherein each antenna contact is configured to create an electrical connection with its respective coupling device on the first side when the first side is securely attached to the second side.

13. The method of claim 12 wherein the notification is provided responsive to the state of each mechanical switch during power ON of the mobile device.

14. The mobile device of claim 12, further comprising:
identifying all antennae on the second side associated with any of a first set of one or more coupling devices on the first side to be electrically disconnected from their respective coupling device when a first mechanical switch associated with the first set of one or more coupling devices is in an "open" state;
identifying all antennae on the second side associated with any of a second set of one or more coupling devices on the first side to be electrically disconnected from their respective coupling device when a second mechanical switch associated with the second set of one or more coupling devices is in an "open" state;

identifying all antennae on the second side associated with any of the first set of one or more coupling devices on the first side to be electrically connected with their respective coupling device when the first mechanical switch associated with the first set of one or more coupling devices is in the "closed" state; and identifying all antennae on the second side associated with any of the second set of one or more coupling devices on the first side to be electrically connected with their respective coupling device when the second mechanical switch associated with the second set of one or more coupling devices is in the "closed" state.

15. The method of claim 14, wherein:
the first mechanical switch is dedicated to one or more antennae for cell band operation; and
the second mechanical switch is dedicated to the remaining antennae.

16. The method of claim 12, further comprising:
identifying all antennae on the second side associated with any of a set of one or more coupling devices on the first side to be electrically disconnected from their respective coupling device when a single mechanical switch associated with the set of one or more coupling devices is in an "open" state; and
identifying all antennae on the second side associated with any of the set of one or more coupling devices on the first side to be electrically connected with their respective coupling device when the single mechanical switch associated with the set of one or more coupling devices is in the "closed" state.

17. The method of claim 12, further comprising providing a notification on a user interface to securely attach the second side to the first side upon determining that any mechanical switch is in the "open" state.

18. The method of claim 12, further comprising creating an electrical path across contacts of the mechanical switch when the first side is securely attached to the second side.

19. An application processor comprising:
a processor;
a storage device for content and programming;
a program stored in the storage device, wherein execution of the program by the processor configures the application processor to perform functions, including functions to:
determine a state of at least one mechanical switch; and
upon determining that any mechanical switch is in an "open" state, provide a notification on an interface of a mobile device having a first side and a second side;
wherein each mechanical switch is configured to be:
in an "open" state when an antenna contact of its associated antenna does not make an electrical connection with its respective coupling device on the first side; and
in a "closed" state when the antenna contact of its associated antenna makes an electrical connection with its respective coupling device on the first side;
wherein the second side is configured to securely attach to the first side; and
wherein each antenna contact is configured to create an electrical connection with its respective coupling device on the first side when the first side is securely attached to the second side.

20. The application processor of claim 19, wherein the application processor further performs functions to:
identify all antennae on the second side associated with any of a first set of one or more coupling devices on the first side to be electrically disconnected from their respective coupling device when a first mechanical switch associated with the first set of one or more coupling devices is in an "open" state;
identify all antennae on the second side associated with any of a second set of one or more coupling devices on the first side to be electrically disconnected from their respective coupling device when a second mechanical switch associated with the second set of one or more coupling devices is in an "open" state;
identify all antennae on the second side associated with any of the first set of one or more coupling devices on the first side to be electrically connected with their respective coupling device when the first mechanical switch associated with the first set of one or more coupling devices is in the "closed" state; and
identify all antennae on the second side associated with any of the second set of one or more coupling devices on the first side to be electrically connected with their respective coupling device when the second mechanical switch associated with the second set of one or more coupling devices is in the "closed" state.

21. The application processor of claim 19, wherein the application processor further performs functions to:
identify all antennae on the second side associated with any of a set one or more coupling devices on the first side to be electrically disconnected from their respective coupling device when a single mechanical switch associated with the set of one or more coupling devices is in an "open" state; and
identify all antennae on the second side associated with any of the set of one or more coupling devices on the first side to be electrically connected with their respective coupling device when the single mechanical switch associated with the set of one or more coupling devices is in the "closed" state.

22. The application processor of claim 19, wherein the application processor further performs the function to provide a notification on a user interface to securely attached the second side to the first side upon determining that any mechanical switch is in the "open" state.

* * * * *